United States Patent [19]

Kimura

[11] Patent Number: 4,741,078
[45] Date of Patent: May 3, 1988

[54] MULTI-FUNCTION INDUSTRIAL ROBOT

[75] Inventor: Akira Kimura, Tokyo, Japan

[73] Assignee: Sony Corporation, Tokyo, Japan

[21] Appl. No.: 788,135

[22] Filed: Oct. 16, 1985

[30] Foreign Application Priority Data

Oct. 19, 1984 [JP] Japan ................. 59-219491

[51] Int. Cl.$^4$ .................................. B25J 15/05
[52] U.S. Cl. ............................... 29/39; 408/35; 901/26; 901/41
[58] Field of Search ........... 414/744 R; 901/41, 26; 29/568, 39, 40, 41; 408/35

[56] References Cited

U.S. PATENT DOCUMENTS

| 4,030,309 | 6/1977 | Mason | 901/41 X |
| 4,563,925 | 1/1986 | Link | 29/568 X |

FOREIGN PATENT DOCUMENTS

| 0092534 | 10/1983 | European Pat. Off. | 901/41 X |
| 58-45840 | 3/1983 | Japan | 29/568 |
| 59-30641 | 2/1984 | Japan | 29/568 |

Primary Examiner—Robert J. Spar
Assistant Examiner—Donald W. Underwood
Attorney, Agent, or Firm—Lewis H. Eslinger

[57] ABSTRACT

A multi-function industrial robot employs an servo motor to select one tool for use from among a plurality of tools mounted on a turret, the base of which is fixed to an end of a vertical spindle and supports a turret shaft that lies at an angle of 45° with respect to the spindle. The turret head on which the tools are mounted is fixed to one end of the turret shaft and it and the tools are configured so that one active tool will be coaxial with the spindle, and a bevel gear mounted at the end of the turret shaft opposite the turret head engages a bevel gear mounted on the robot frame. The spindle can be raised and lowered such that at its uppermost position the two bevel gears engage, and a mechanism that normally prevents rotation of the turret shaft is released so that as the spindle turns the turret-mounted bevel gear revolves about the stationary bevel gear and drives the turret shaft and the turret head for rotation. By turning the spindle through a specific angle, a specific tool can be moved into alignment with the spindle. When the spindle is lowered, the bevel gears disengage and the locking mechanism prevents further rotation of the turret shaft and rotation of the spindle is directly transmitted to rotate the selected tool.

12 Claims, 10 Drawing Sheets

MULTI-FUNCTION INDUSTRIAL ROBOT

BACKGROUND OF THE INVENTION

1. FIELD OF THE INVRENTION

This invention relates generally to an industrial robot and, more particularly, to a multi-function industrial robot that performs a plurality of different operations, using different, selected tools.

2. DESCRIPTION OF THE BACKGROUND

Industrial robots are now known for use in various industries because of accuracy of repetition and high efficiency, and many such robots are employed on assembly lines, in which the robots are required to perform numerous different sequential operations, such as positioning workpieces in a working position, tightening bolts or screws, welding, and the like. In order to be able to perform these different operations, the robots must be equipped with several different tools at their working ends. Therefore, when a single robot is used to perform various operations, it is necessary to change tools according to the required operations and predetermined schedule of operations.

There are typically two known ways to change tools to enable multi-operations using a single robot, one of which is to stock all necessary tools in a tool stocker, with the tools specifically arranged in the tool stocker so that the robot can pick up the necessary tools according to the programmed schedule of operations. In this technique, the robot is programmed to move its working end to a point opposite the tool stocker at the conclusion of every operation, in order to change tools. This involves a waste of time and energy in repeatedly moving the working end of the robot between the tool stocker and the working position, which clearly lowers the robot's efficiency. Moreover, this drop in the robot efficiency becomes more significant as the number of operations increases.

To avoid these extra motions of the robot's working end, it is known to provide a turret for mounting necessary tools. The turret is actuated by a turret controlling servo that positions the tool intended to perform the next operation opposite the work position, which eliminates the extra movements of the working end between the working position and the tool stocker. Nevertheless, this system requires a turret controlling servo apparatus that generally involves at least a servo motor and a reduction gear assembly and, because of the additional weight of the turret caused by the tools and the turret controlling servo, the moment of inertia of the robot arm is increased significantly. This increased inertia limits the top speed of the working end in order to provide sufficient accuracy in positioning the working end at the working position. Furthermore, even at a limited arm speed, back-lash inherent in the reduction gear assembly lowers the accuracy in positioning of the working end.

SUMMARY OF THE INVENTION

Accordingly, it is an object of the present invention to provide a multi-function industrial robot that can eliminate the above-noted defects inherent in systems known heretofore.

Another object of the present invention is to provide a multi-function industrial robot having high efficiency when performing a number of different operations.

In accordance with an aspect of the present invention, a multi-function industrial robot employs a turret mounting a plurality of tools used to perform various operations and a turret controlling servo having no independent power source is used to drive the turret. In such industrial robot an arm is pivotally supported at one end and a vertical spindle is rotatably supported at the other end of the arm. A drive system for rotating and vertically moving the spindle is provided and a turret base is fixed to one end of the spindle, with a turret shaft being rotatably supported by the turret base. The turret head is fixed to one end of the turret shaft and has the appropriate tools mounted thereon. A rotary motion transmitting system transmits the rotary motion of the spindle to the turret shaft.

In another aspect of the present invention, the robot further comprises a mechanism for locking the turret head, as well as a device for releasing the locking mechanism. The rotary motion transmitting system has a first circular gear, a cylindrical member that is fixed at the other end of the arm around the spindle and on which the first circular gear is mounted, and a second gear fixed to the turret shaft. The turret shaft passes into the turret base and the second gear is fixed to the turret shaft at the other end of the turret shaft, such that the first and second gears engage at the highest position of the spindle, and the locking means mechanism is released by the releasing device.

The turret head is locked by the locking mechanism any time that the shaft is positioned other than at the highest position. In one embodiment, the number of gear teeth in the first and second gears are equal, and the angle of the turret shaft relative to the spindle is approximately 45 degrees.

According to a further aspect of the invention, a multi-function industrial robot is comprised of a movable arm member on which is mounted a working end of the robot for movement within a robot coordinate system. The movable arm member includes a rotary component rotatable about a first axis and a servo system associated with the movable member for driving the movable arm member according to a preset program. The servo system is adapted to drive the rotary component of the movable arm member to rotate the rotary component of the movable arm member about the first axis, and a rotary tool mount is attached to the working end of the movable arm member for mounting a plurality of tools. The rotary mount is rotatable about a second axis for aligning a selected one of the tools mounted thereon to a working position. A power transmission system transmits rotation of the rotary component of the movable arm member to the rotary tool mount for varying the angular orientation of the tools for aligning the tool with the working position. The power transmission system also disconnects the rotary component of the movable arm member and the rotary tool mount, while one of the tools that has been aligned in the working position is in operation.

The manner in which these and other objects, features, and advantages of the present invention are achieved will become apparent from the following detailed description of illustrative embodiments thereof, to be read in conjunction with the accompanying drawings, in which like numerals represent the same or similar parts.

DETAILED DESCRIPTION OF PREFERRED EMBODIMENTS

Figure 1:
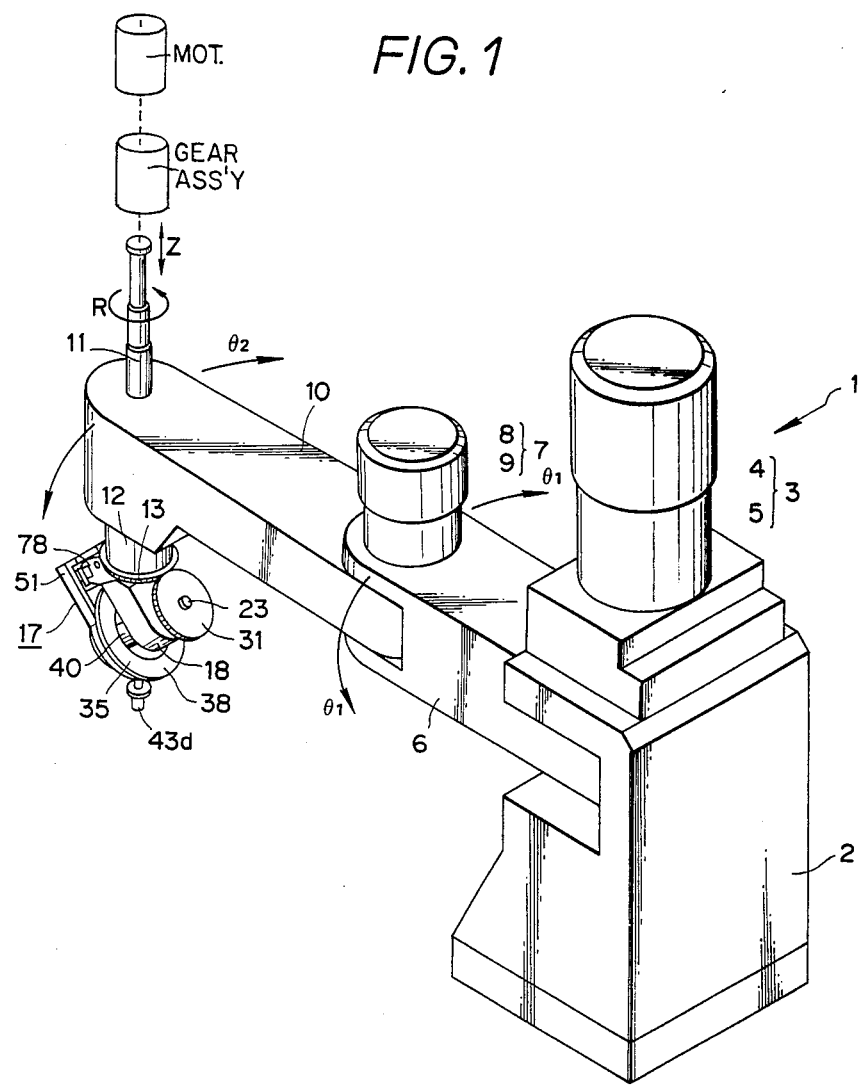
FIG. 1 is a perspective view of a preferred embodiment of a multi-function industrial robot according to the present invention.

FIG. 1 represents a multi-function industrial robot 1 having first and second horizontally pivotably arms 6 and 10, in which first pivotal arm 6 is supported by a base frame 2 for pivotal movement about a first vertical axis. First pivotal arm 6 is operably connected to a first servo 3, which comprises a first servo motor 4 and a first reduction gear assembly 5, and first pivotal arm 6 pivotably supports second pivotal arm 10 at its free end. Second pivotal arm 10 is horizontally pivotable about a second vertical axis and is connected to a second servo 7, which comprises a second servo motor 8 and a second reduction gear assembly 9.

A vertically movable spindle 11 extends through the free end of second pivotal arm 10 and is movable along a third vertical axis Z for raising and lowering the turret head 17 along the third vertical axis. Spindle 11 is also rotatable about the third vertical axis to rotate turret head 17 and select one of a plurality of tools, one of which is shown typically at 43d in FIG. 1, that are held by the turret head. To allow rotation of vertically movable spindle 11 a bearing (not shown) is provided in the free end of second pivotal arm 10. Vertical spindle 11 is connected to a third servo (not shown) housed in the free end of second pivotal arm 10, and this third servo may comprise a third servo motor and a third reduction gear assembly for driving spindle 11 vertically along the third vertical axis Z and to rotate about that third axis.

All of the servos that are employed include rotation angle sensors for monitoring the angular displacement of the corresponding arms 6 and 10 and spindle 11, and rotation speed sensors for monitoring the speed of the arms and the spindle. The third servo can also include a height sensor for monitoring the vertical displacement of spindle 11 and, thus, detecting the vertical position of the working end of the robot. These sensors generate sensor signals serving as feedback signals for performing feedback or feedforward control for the first, second and third servos in the manner of known robots of this kind. Although this embodiment is described in terms of three vertical axes, two horizontally pivotable arms, and a single vertically movable spindle, the present invention need not be so limited but is applicable to any robot designed to perform a plurality of different operations.

Figure 2:
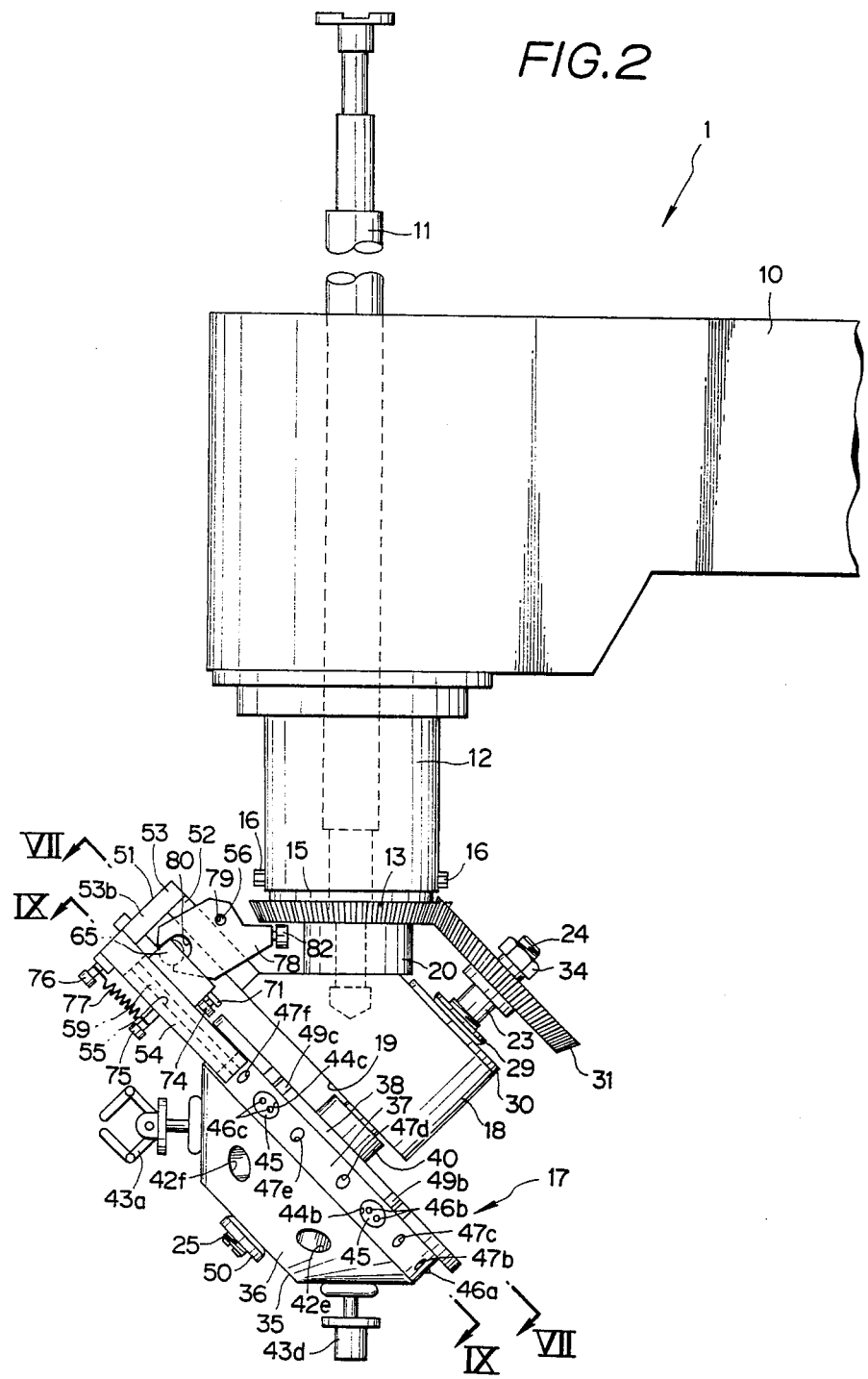
FIG. 2 is a side elevation of a portion of the multi-function industrial robot of FIG. 1, showing a tool changing operation.
Figure 3:
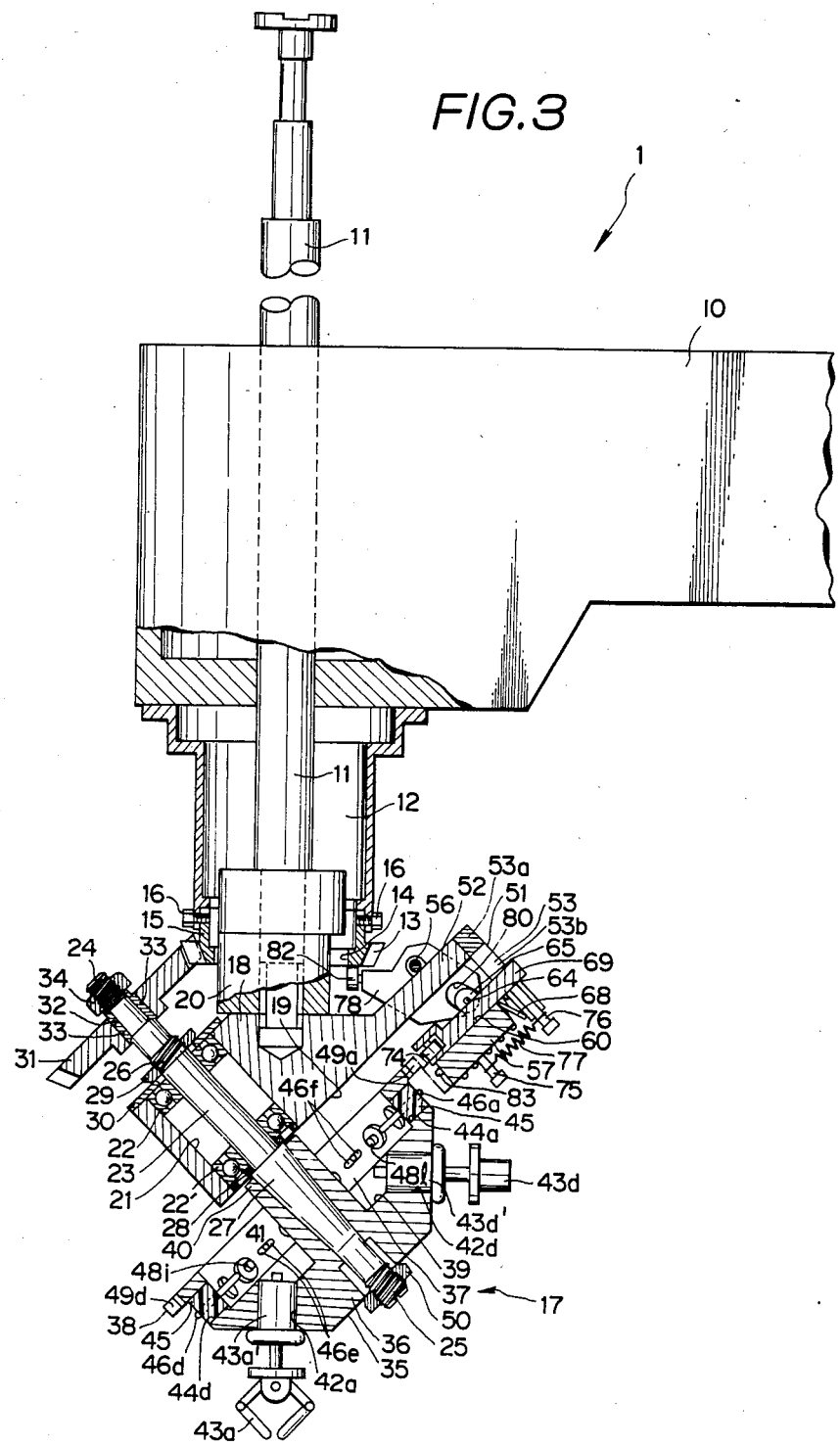
FIG. 3 is a side elevation in partial cross section of a portion of the robot, in which a selected tool is ready for operation.
Figure 4:
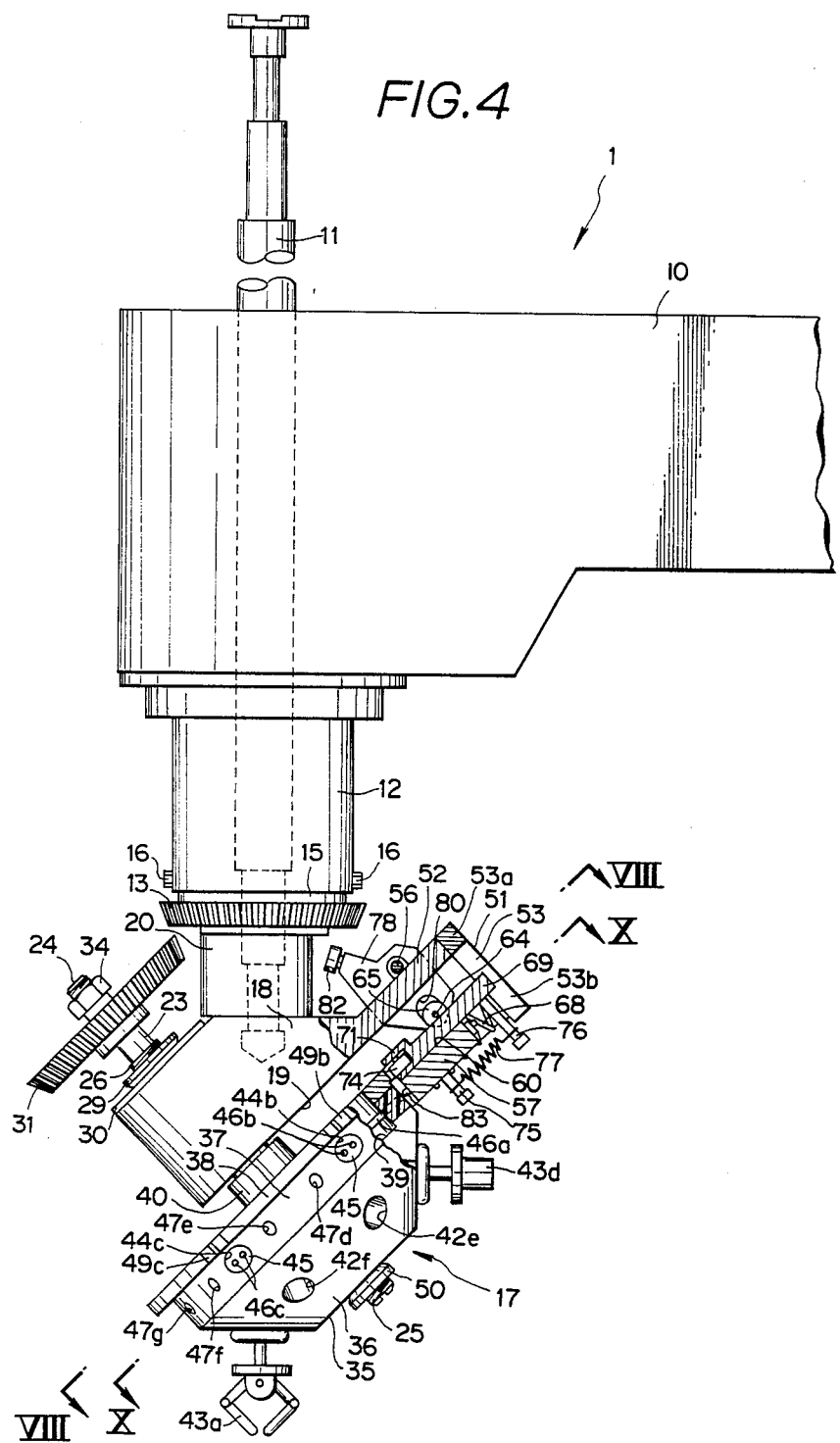
FIG. 4 is a side elevation in partial cross section of a portion of the robot, in which the working end is aligned with its working position.

As shown in FIGS. 2 through 4, a cylindrical extension 12 extends downwardly from a lower surface of second pivotal arm 10 and is co-axial with vertically movable spindle 11. A lower end 14 of cylindrical extension 12 end opens downwardly and a bevel gear 13 having a cylindrical upper section 15 engages lower end 14 of cylindrical extension 12 and is secured thereto by one or more bolts 16. Because cylindrical extension 12 is rigidly fixed to second pivotal arm 10, bevel gear 13 does not rotate relative to second pivotal arm 10 and thus serves as a stationery gear.

Vertically movable spindle 11 extends downwardly through bevel gear 13 and is connected to a turret base 18 at its lower end. Turret base 18 has a lower planar base surface 19 that is oblique to the third vertical robot axis Z at an angle of approximately 45°. Turret base 18 also has an upward extension 20 through which turret base 18 is connected to the lower end of vertically movable spindle 11. Turret base 18 has a through opening 21 extending substantially perpendicularly to planar base surface 19, and a pair of bearings 22 and 22' are disposed at opposite ends of through opening 21. A turret shaft 23 extends through opening 21, is rotatably supported by bearings 22 and 22', and has threaded ends 24 and 25 with an intermediate threaded section 26. Turret shaft 23 also has a section 27 that tapers toward lower threaded end 25, and the upper end of section 27 forms a shoulder that abuts bearing 22' by means of a washer 28. A nut 29 and a washer 30 are threaded over the intermediate threaded section 26 and serve to retain upper bearing 22. Thus, turret shaft 23 is retained in place in turret base 18 by the shoulder and by nut 29.

With this arrangement, turret shaft 23 is supported by turret base 18 with its longitudinal axis lying oblique to the third vertical robot axis Z at an angle of about 45°. A bevel gear 31 is mounted on the upper end of turret shaft 23 near threaded end 24, and the bevel gear 31 is substantially identical to stationary bevel gear 13 and has an equal diameter and an equal number of gear teeth. Bevel gear 31 is fixed to turret shaft 23 by keys 33 and a fastener nut 34 engaging threaded end 24, whereby bevel gear 31 is rotatable with turret shaft 23.

Because vertically movable spindle 11 moves vertically along the third vertical robot axis Z by means of the third servo, turret base 23 also moves vertically along the same robot axis. At the uppermost position of vertically movable spindle 11, turret base 23 will move bevel gear 31 into engagement with stationary bevel gear 13, whereas when vertically movable spindle 11 is lowered bevel gear 31 is released from engagement with stationary bevel gear 13.

A turret 35 is mounted on tapered section 27 of turret shaft 23 and has a generally conical tool mounting section 36 and a cylindrical extension 37, which extend axially from the peripheral edge of the tool mounting section and has an outward flange at its upper edge. Conical tool mounting section 36 defines on its upper face a conical recess 39, and a boss 40 extends upwardly through conical recess 39. Boss 40 is long enough to surround almost the entire length of tapered section 27 of turret shaft 23 and, in order to engage tapered section 27 of the turret shaft 23, boss 40 has a tapered through opening 41 conforming to the taper of section 27. A nut 50 engages the threaded end 25 of turret shaft 23 to fix turret 35 onto the turret shaft.

The conical tool mounting section 36 of turret 35 has a plurality of tool mounting holes 42a, 42b, 42c, 42d, 42e, and 42f that are arranged radially and symmetrically about the tapered periphery of the tool mounting section and in this embodiment are spaced at about 60°. Each of tool mounting holes 42a, 42b, 42c, 42d, 42e, and 42f extends substantially perpendicularly to the tapered surface of tool mounting section 36 between the tapered periphery of the tool mounting section at one end and conical recess 39 at the other end.

Tools 43a and 43d have mounting sockets 43a' and 43d' that are engageable with corresponding tool mounting holes 42a and 42d and in this embodiment tools 43a and 43d are spaced about conical tool mounting section 36 of the turret at intervals of 180°, however, the arrangement and number of tools can be modified in many ways in keeping with the present invention.

A plurality of connector terminal rests 44a, 44b, 44c, 44d, 44e, and 44f are formed around the periphery of cylindrical extension 20 of turret base 18 and are arranged opposite respective tool mounting holes 42a, 42b, 42c, 42d, 42e, and 42f. Pairs of connector terminals 46a, 46b, 46c, 46d, 46e, and 46f, surrounded by respective insulators 45a, 45b, 45c, 45d, 45e, and 45f, are disposed within each connector terminal rest 44a, 44b, 44c, 44d, 44e, and 44f, respectively. In this embodiment, the ends of connector terminals 46 extend slightly beyond the outer periphery of cylindrical extension 20.

Holes 47a to 47l pass through the periphery of the cylindrical extension 20 and extend radially and two holes are arranged between each pair of connector terminal rests 44. Pneumatic or hydraulic lines 48a to 48l having respective outer flanges 48a' to 48l' pass through holes 47a to 47l, and flanges 48a' to 48l' rest on the outer peripheral surface of cylindrical extension 20 and project slightly therefrom.

Each of tools 43a and 43d, as well as 43b, 43c, 43e, and 43f if necessary, are built as assemblies including appropriate sensors (not shown) for monitoring operation of the tool. The sensors are connected to a controller through connector terminals 46a and 46d corresponding to the tools 43a and 43d, and tools 43a and 43d are also built with one or more purge-air passages (not shown). The purge-air passages are connected to the corresponding pneumatic lines 48a, 48b and 48g, 48h .

Figure 5:
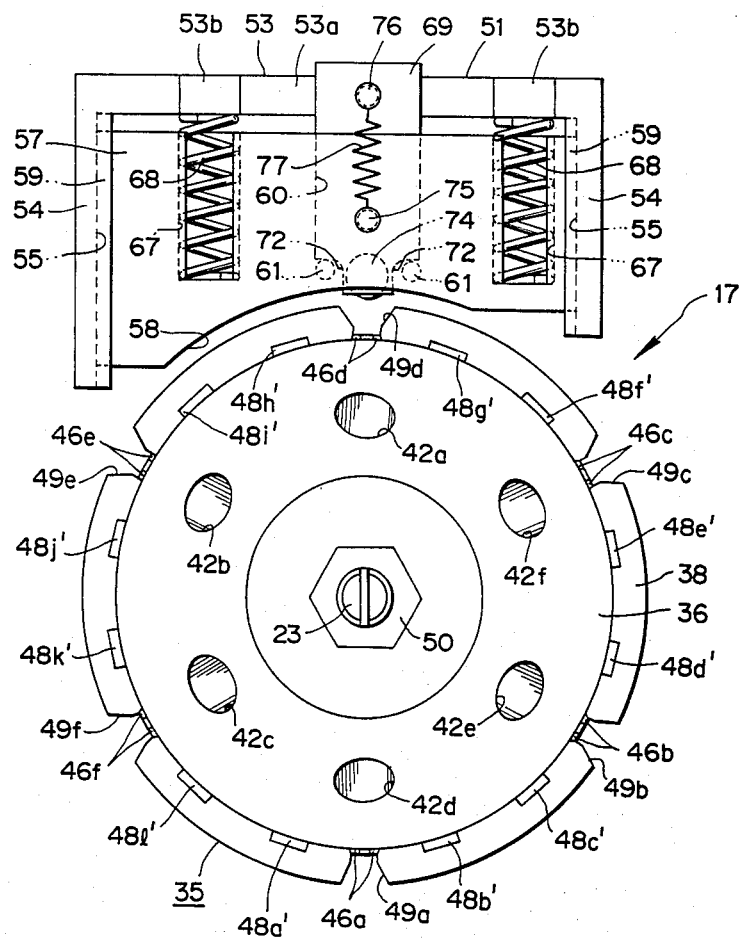
FIG. 5 is a bottom plan view of a turret attached to a wrist portion of the robot for carrying a plurality of FIG. 6 is an exploded perspective view of the turret of FIG. 5.
Figure 6:
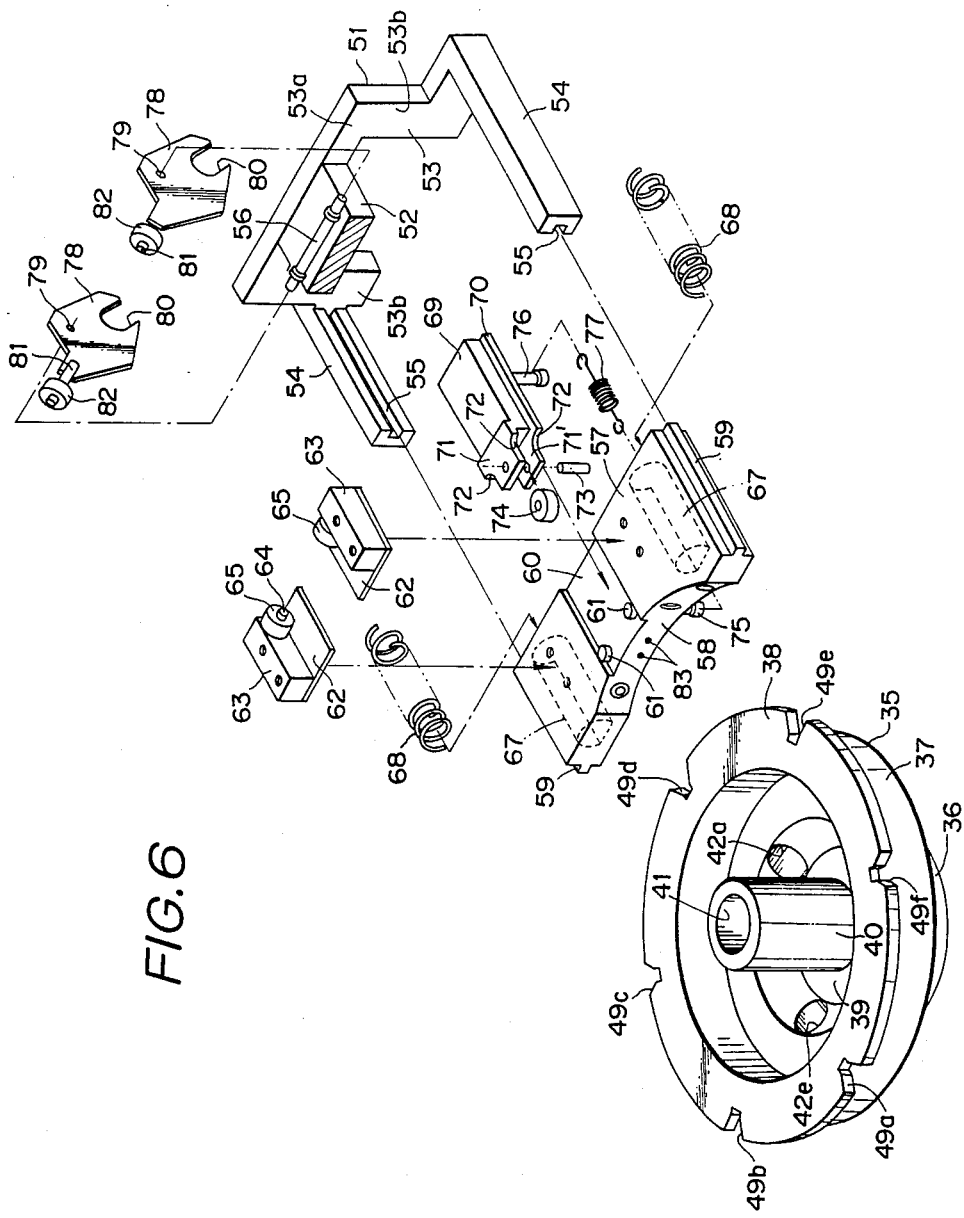
Figure 7:
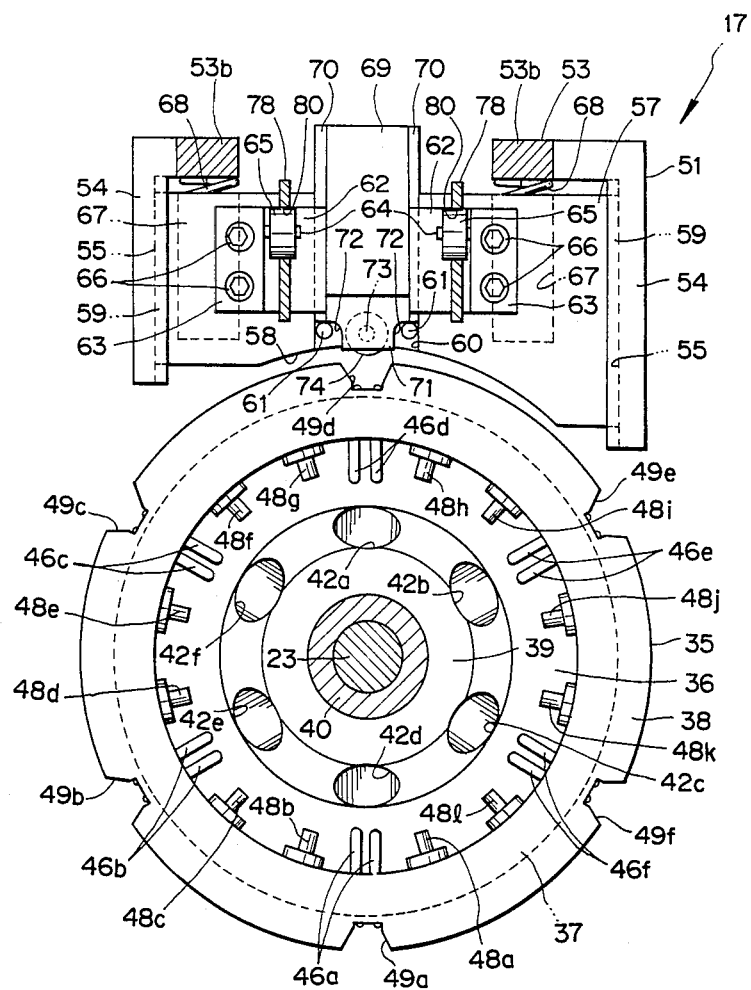
FIG. 7 is a cross-sectional view taken along section lines VII—VII of FIG. 2.
Figure 8:
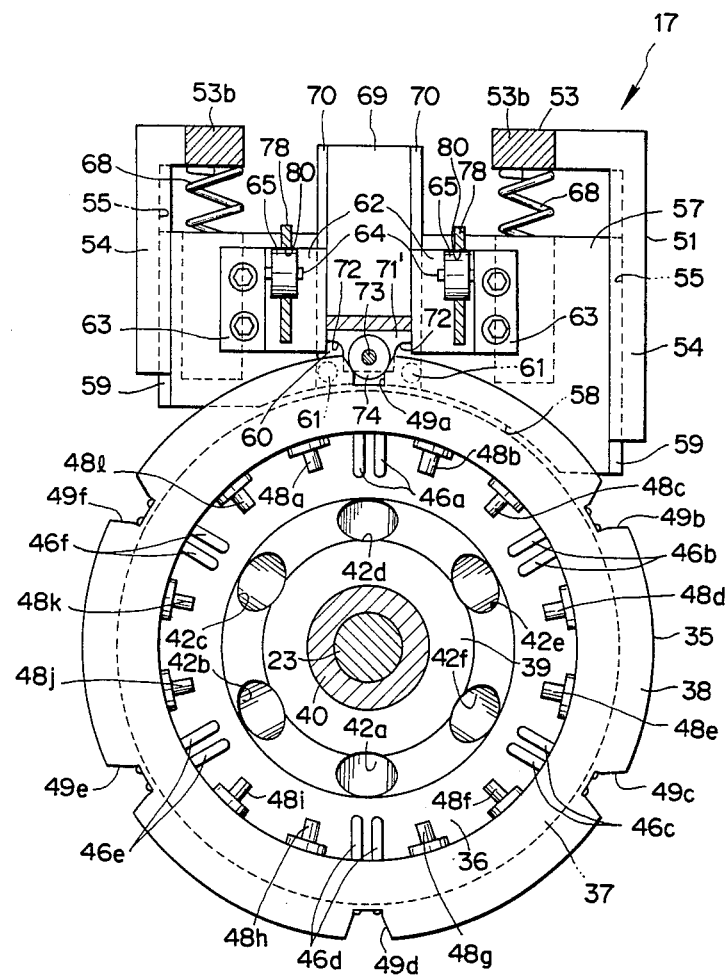
FIG. 8 is a cross-sectional view taken along section lines VIII—VIII of FIG. 4.
Figure 9:
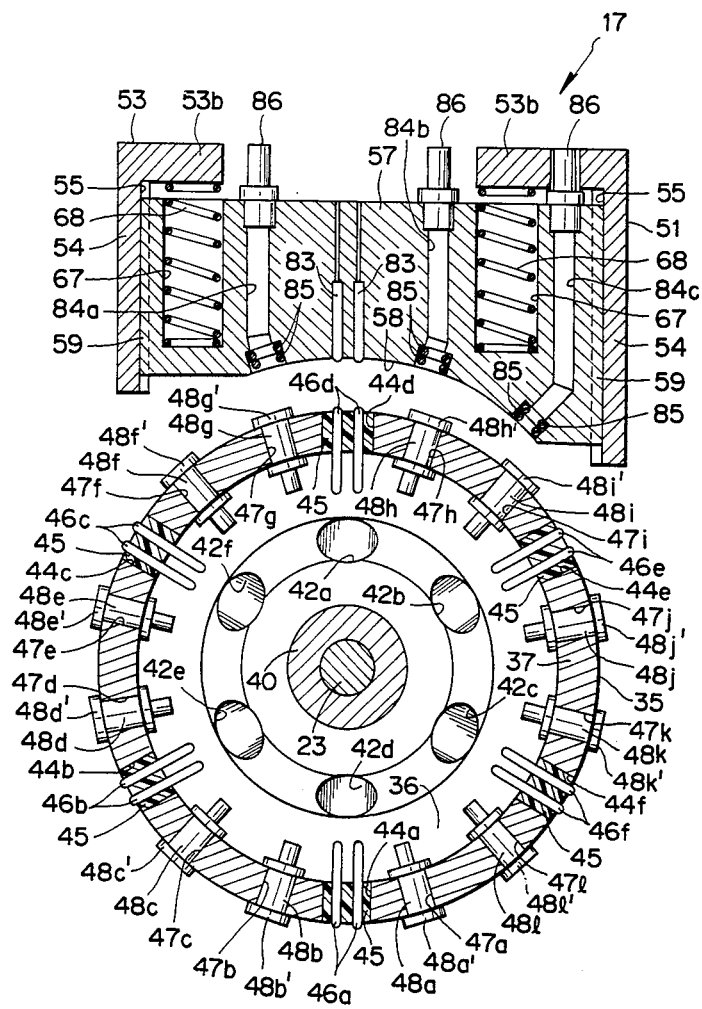
FIG. 9 is a cross-sectional view taken along section lines IX—IX of FIG. 2.
Figure 10:
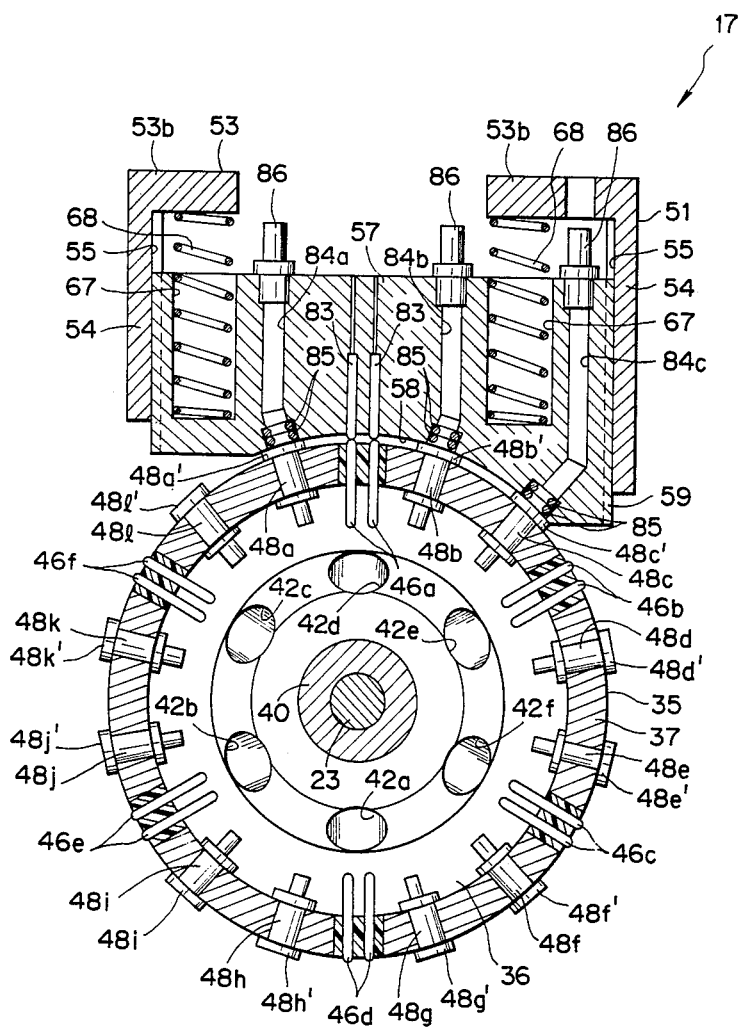
FIG. 10 is a cross-sectional view taken along section lines X—X of FIG. 4.

Flange 38 of cylindrical extension 37 has cut-outs 49a, 49b, 49c, 49d, 49e, and 49f, each of which has a trapezoidal configuration in plan view, and which are radially symmetrically arranged at positions opposite the tool mounting holes 42a, 42b, 42c, 42d, 42e, and 42i f, respectively, as shown in FIG. 5.

As noted in FIGS. 2 through 4, tool mounting holes 42a and 42b, 42c, 42d, 42e, and 42f are so arranged that the axis of the tool that is vertically aligned also lies in alignment with the third vertical robot axis Z and in the following description the tool position in which the axis of the tool is in alignment with this third vertical robot axis will be referred to as the "operating position of the tool". On the other hand, tool positions in which the axis of the tool is offset from or oblique to the third vertical robot axis will be referred to as "non-operating position of the tool". Because turret 35 is firmly secured to turret shaft 23 by nut 50 at an angle of 45° with respect to the third vertical robot axis, tools 43a and 43d must follow a course passing through the operating position as the turret 35 rotates. Furthermore, because tool mounting holes 42a, 42b, 2c, 42d, 42e, and 42f are arranged every 60°, one of the respective tool mounting holes 42a, 42b, 42c, 42d, 42e, and 42f will coincide with an operating position with every 60° of rotation of turret 35.

Tools 43a and 43d are mounted on turret 35 at an angular spacing of 180°, so that when tool 43d is moved to a non-operating position by 180° of turret rotation, tool 34a is moved to the operating position. When a tool 43 is in the operating position, it is vertically movable along the third vertical robot axis Z together with turret 35 and is rotatable in the direction R in FIG. 1 about the third vertical robot axis Z, together with vertically movable spindle 11. Therefore, a tool 43 in the operating position is movable toward and away from the workpiece according to vertical movement of vertically movable spindle 11.

In order to change tool that is being used, turret 35 must be raised away from the workpiece. At the predetermined uppermost position of the turret, bevel gear 31 that is secured to turret shaft 23 comes into engagement with stationary bevel gear 13, as shown in FIG. 1, and when vertically movable spindle 11 is rotated about the third vertical robot axis Z, turret base 18 that is secured to the lower end of the spindle 11 and turret shaft 23 rotate through the same angle. Thus, rotation of spindle 11 causes both a re-orientation of turret 35 and a rotation of turret 35, thereby to move a new tool 43 in into operating position. In practice, the rotation angle of vertical movable spindle 11 will match the angular displacement required to move the appropriate tool suitable for the next required operation into its operating position.

Therefore, as seen from the above, rotation of vertically movable spindle 11 is converted into angular displacement of the tools 43 through a corresponding angle, and this allows control of the tool position simply by controlling rotation of the vertically movable spindle 11 about the third vertical robot axis Z.

Turning now to FIGS. 5 through 10, a pad 57 is mounted on the end of turret base 18 that is remote from turret shaft 23 by means of a pad supporting frame 51, which is connected to an upward projecting section 52 of base 18. Pad supporting frame 51 has a base 53 with a horizontal section 53a and a pair of vertical sections 53b extending downwardly from either end of horizontal section 53a and guide rails 54 extend from the lower edges of vertical sections 53b.

Guide grooves 55 are formed in the mutually opposing surfaces of guide rails 54 and engage elongated extensions 59 of the sides of pad 57. In this fashion, pad 57 is movably supported along guide rails 54 relative to turret 35.

Pad 57 also has a curved edge 58 arranged in opposing relationship to turret 35, and radius of curvature of curved edge 58 essentially matches the radius of curvature of the outer periphery of cylindrical extension 37 of turret 35. Pad 57 also has an axial groove 60 on its upper surface, and a pair of projections 61 extend vertically from the bottom of the groove 60 at points near the curved edge 58. The height of projections 61 approximately matches the depth of groove 60, so that the tops of the projections lie flush with the upper surface of pad 57, and pairs of threaded holes 60a are formed that open onto the upper surface of pad 57.

A pair of substantially square plates 62 bearing support blocks 63 are fixed to the pad 57 by bolts 66 that extend through threaded holes 63a in the support blocks 63 and the square plates 62. Shafts 64 extend toward each other from opposing sides of support blocks 63 and rotatably support rollers 65. The inner edges of the pair of square plates 62 overlap the edges of groove 60.

A pair of holes 67 are formed in the sides of pad 57 and each opens onto the back-side face of pad 57 that is remote from turret 35. Coil springs 68 seat on the closed end of each of the pair of holes 67 and are almost completely accommodated therewithin. The outer ends of coil springs 68 protrude out of the open rearward ends of holes 67 and abut the vertical sections 53b of pad supporting frame 51. Thus, pad 57 is normally biased toward turret 35 by the biasing force of coil springs 68.

A slider 69 supported by pad 57 is free to slide toward and away from turret 35 and has a pair of extensions 70 projecting outward from the longitudinal edges of its lower surface. Slider 69 also has upper and lower front tabs 71 and 71', respectively, extending forwardly from its front end. Upper and lower front tabs 71 and 71' lie parallel to each other in vertical spaced apart relationship and forward edges of tabs 71, 71' are trimmed to form cut-outs 72. A pin 73 extends vertically across the clearance between upper and lower tabs 71 and 71' and engages respective holes in the upper and lower front tabs 71 and 71'. The clearance between the upper and lower front tabs 71 and 71' is slightly greater than the thickness of flange 38 of turret 35, and a locking roller 74 is mounted within the clearance between upper and lower front tabs 71 and 71' and is free to rotate about pin 73.

The vertical thickness of transverse extensions 70 of the slider 69 matches the depth of groove 60, therefore, extensions 70 engage grooves bounded by the groove 60 and the parts of square plates 62 overlapping groove 60, so that slider 69 slides along the aforementioned guide grooves, which the transverse extensions 70 engage.

A pin 75 extends downwardly from the under surface of pad 57, and similarly, a pin 76 extends downwardly from the underside of slider 69. A coil spring 77 is retained in tension between pin 75 and pin 76 and thereby thus normally biases slider 69 toward turret 35 relative to pad 67. Cut-outs 72 are formed to abut projections 61 at the forward limit of travel of slider 69, so that when curved section 58 of pad 57 is in contact with cylindrical extension 37 of turret 35, locking roller 74 engages one of cut-outs 49a, 49b, 49c, 49d, 49e, and 49f.

A pivot shaft 56 is rotatably mounted on upward projecting section 52 of pad supporting frame 51, and the ends of pivot shaft 56 extend over the edges upward projecting section 52. A pair of locking levers 78 are mounted on the ends of pivot shaft 56 by holes 79 formed therein and have essentially U-shaped recesses 80 that open downwardly. The downwardly opening ends of U-shaped recesses 80 oppose rollers 65 mounted on pad 57 and receive rollers 65, with the edges of recesses 80 slidingly contacting the peripheral surfaces of rollers 65.

Mounted on each locking lever 78 is a pin 81 extending toward stationary bevel gear 13 from the upper ends of lock levers 78, and the upper ends of the pins 81 oppose the lower surface of the stationary gear, as shown in FIG. 2 to 4, with each pin 81 rotatably supporting a respective roller 82.

Pad 57 also has a two-element connector terminal 83 arranged on its curved edge 58 and the connector terminal 83 projects slightly beyond the surface of curved edge 58 of pad toward turret 35. Connector 83 makes the connection to the controller (not shown) for controlling the robot. Pad 57 also has a plurality of compressed air passages 84a, 84b, and 84c that have larger diameter ends opposite turret 35, and 0-rings 85 serve to seal the larger diameter ends. The ends of compressed air passages 84a, 84b, and 84c remote from turret 35 are also of increased diameter, and compressed air supply tubes 86 are connected to the end remote from turret 35. The compressed air supply tubes 86 are connected to a compressed air source (not shown) via a control valve (not shown) in the conventional fashion.

The connector terminal 83 and the near ends of compression air passages 84a, 84b, 84c are arranged to be connected respectively to one of connector terminals 46a, 46b, 46c, 46d, 46e and 46f and to three of the compressed air passages 48a to 48 when curved edge 58 of pad 57 engages the outer periphery of turret 35.

The operation of the above-described embodiment of the multi-operation industrial robot according to the present invention is described below and is directed to the steps needed to change tools, movement of pad 57 during the tool-change operation and locking of turret 35 by means of locking roller 74. Turning back to FIG. 2 then, tool 43d is shown having just been used in a previous operation and it is noted that when tool 43d was in operation for performing the required operation, vertically movably spindle 11 and turret head 17 were in a position lower than illustrated in FIG. 2. During upward movement of turret head 17 and vertical spindle 11, rollers 82 come into contact with the lower surface of stationary bevel gear 13 and are pushed downwardly. The downward force exerted on rollers 82 causes locking levers 78 to rotate clockwise, as seen in FIG. 2, about pivot shaft 56. This rotational movement of locking levers 78 exerts a force against springs 68 mounted on pad 57 via rollers 65 received in the recesses 80 of locking levers 78 and, as a result, pad 57 is shifted away from turret 35.

This movement of pad 57 releases locking roller 74 mounted at the front end of slider 69 from one of the cut-outs 49a, 49b, 49c, 49d, 49e, or 49f in which it was engaged. At the same time, connector terminal 83 separates from the corresponding connector terminals 46d and 36d and the compressed air passages 84a, 84b, and 84c separate from the corresponding compressed air passages 48g, 48h, and 48i, respectively.

In the position shown in FIG. 2, the robot is ready to change tools for use in the next operation. The controller (not shown) issues a control signal ordering the third servo to rotate vertically movable spindle 11 about the third vertical robot axis Z through an angle sufficient to rotate turret 35 to move the next tool to be used into its operating position. According to the rotation of vertically movable spindle 11 driven by the third servo, turret base 18 and bevel gear 31 rotate about the third vertical robot axis Z in direction R of FIG. 1. In this embodiment, because the other tool 43a is to be used in the next operation, vertically movable spindle 11 is rotated through 180° from the position shown in FIG. 2. During this rotational movement of turret base 18 about the third vertical robot axis Z, the bevel gear 31 revolves around bevel gear 13, as it rotates about the rotation axis of turret shaft 23. At this time, because locking roller 74 is separated from cut-outs 49a, 49b, 49c, 49d, 49e, and 49f, turret 35 can rotate freely. Because the bevel gears 13 and 31 are identical and having the same number of gear teeth and are of the same diameter, the rotation of turret 35 about the rotation axis of turret shaft 23 matches the rotation, i.e. 180°, of vertically movable spindle 11. Therefore, turret 35 rotates through 180° to move tool 43a to the operating position.

Once tool 43a is in the operating position, as shown in FIG. 3, connector terminal 46a in cylindrical extension 37 of turret 35 comes into opposition with connector terminal 83 of pad 57. Also, at this time, the end of purge passages 48a, 48b and 48c come into opposition with purge passages 84a, 84b, and 84c.

Although it is not shown in detail, an appropriate sensor may be associated with the third servo and/or turret 35 to supply turret and/or tool position indicative signals to the controller. The controller performs feedback or feedforward robot control to exactly position the desired tool to the appropriate operating position and, after precise positioning of the desired tool, i.e. tool 43a, has been completed, the controller outputs a control signal ordering the third servo to lower vertically movable spindle 11. Lowering vertically movable spindle 11 also lowers turret head 17, accordingly, turret base 18 drops together with bevel gear 31, to separate bevel gears 13 and 31, as shown in FIG. 4. Furthermore, during this downward movement of turret head 18, rollers 82 disengage from the lower surface of stationary bevel gear 13, and pad 57 moves toward turret 35 under the force of coil springs 68.

Movement of pad 57 toward turret 35 causes curved edge 58 of pad 57 to come into contact with the outer periphery of cylindrical extension 37 of the turret, so that connector terminal 83 engages corresponding connector terminal 46a. Similarly, compressed air passages 84a, 84b, and 84c are connected to the respective corresponding compressed air pipes 48a, 48b and 48c. At the same time, locking roller 74 at the front end of slider 69 engages the opposing cut-out 49a in the peripheral edge of the flange 38. Locking engagement between locking roller 74 and cut-out 49a prevents turret 35 from rotating relative to turret base 18.

Locking engagement between locking roller 74 and cut-out 49a is facilitated by the taper of cut-outs 49, thus, engagement between locking roller 74 and cut-out 49 is ensured, even when turret 35 is slightly angularly offset from the desired angular position. If turret 35 should be somewhat offset, a rotational force is generated by contact between locking roller 74 and the tapered periphery of the cut-out, to correctly position the turret at the desired angular position at which tool 43a is exactly positioned in the operating position. When locking roller 74 engages cut-out 49a, slider 69 is pushed backwardly relative to pad 57, and this increases the tension on spring 77 so that a greater spring force biases slider 69 and locking roller 74 toward turret 35. This increased spring force further ensures locking engagement between locking roller 74 and cut-out 49a.

The controller (not shown) then issues a control signal ordering robot arms 6 and 10 and vertically movable spindle 11 to move tool 43a to the next working position. At the working position of tool 43a, the controller issues further control signals ordering tool 43a to rotate via vertically movable spindle 11 or via compressed air supplied through the air control valve in the compressed air passage.

It will be appreciated from the above that, because this embodiment of the multi-operation robot utilizes rotation of the vertically movable spindle, no extra servo system is required for tool selection. This not only helps simplify the robot structure but also helps reduce the total weight of the moving components of the robot.

Reducing the weight, and thus the moment of inertia of the moving components, allows higher speed of operation of the robot.

Furthermore, according to this embodiment of the invention, the locking means for locking the turret at the desired angular position for exact alignment of the selected tool to the work ensures highly accurate robot operation.

Although the present invention has been disclosed in detail in terms of the specific embodiment of the invention, the invention can be embodied otherwise without departing from the spirit and scope of the invention, as set out in the appended claims. For example, although bevel gears have been employed to convert rotation of the vertically movable spindle into rotation of the turret about its rotational axis, the bevel gears can be replaced with friction rollers and equivalent rotation transmitting components. Furthermore, though the invention has been disclosed with respect to a specific robot with three vertical axes, the invention is equally applicable to any type of robot intended to perform various operations. In any case, it is intended that the scope of the invention be defined solely by the appended claims.

What is claimed is:

1. An industrial robot for use with at least two tools, comprising:
    a frame;
    arm means pivotally supported at one end on said frame;
    a spindle rotatably supported and arranged for vertical movement at an end of said arm means opposite said frame, said spindle arranged to extend vertically relative to said arm;
    a turret base element fixed to one end of said spindle and rotatable with said spindle about a first axis;
    a turret shaft rotatably supported by said turret base element;
    a turret head fixed at one end of said turret shaft, having the tools mounted thereon, and being rotatable with said turret shaft about a second axis angularly arranged relative to said first axis; and
    coupling means for selectively transmitting rotational motion of said spindle, about said first axis to said turret shaft about said second axis in a coupled state, whereby said turret head is rotated to select one of said at least two tools, and for disconnecting rotary motion about the first axis from rotary motion about the second axis.

2. An industrial robot according to claim 1, further comprising means for locking said turret head from rotation, and means for releasing said locking means to permit rotation of said turret head.

3. An industrial robot according to claim 2, wherein said coupling means for transmitting said rotational motion comprise a first circular gear mounted on the end of said arm means supporting said spindle, a cylindrical member fixed to said end of said arm means supporting said spindle, amd a second circular gear fixed to said turret shaft.

4. An industrial robot according to claim 3, wherein said turret shaft is arranged to pass through said turret base and said second circular gear is fixed to said turret shaft at an end opposite the turret head.

5. An industrial robot according to claim 4, wherein said first and second circular gears are arranged to engage at an upper limit of vertical travel of said spindle, whereat said locking means is released by said releasing means.

6. An industrial robot according to claim 3, wherein a number of gear teeth in each of said first and second circular gears are equal.

7. An industrial robot according to claim 4, further comprising mens for mounting said turret shaft oblique to said spindle at an angle substantially equal to 45 degrees.

8. A multi-function industrial robot having a frame and for operating a plurality of tools comprising:
- a movable arm member mounted on said frame and having one end thereof constituting a working end of the robot for moving said working end within a robot coordinate system and including a rotary component rotatable about a first axis and movable along said first axis between first and second end positions;
- a servo system operably connected with said movable arm member for driving said movable arm member according to a preset program and to rotatably drive said rotary component of said movable arm member in rotary motion about said first axis;
- a rotary tool mount attached to said working end of said movable arm member for mounting said plurality of tools and being rotatable about a second axis to align one of said plurality of tools mounted thereon to a working position;
- power transmission means for selectively transmitting rotary motion of said rotary component of said movable arm member to said rotary tool mount in a first selected state corresponding to said first end position to cause angular rotation of said plurality of tools for aligning one of said plurality of tools in said working position, and in a second selected state corresponding to said second end position, said power transmission means disconnects the rotary motion in the first axis of said of said movable arm member from the rotary motion in the second axis of said rotary tool mount when said one of said plurality of tools is aligned to said working position and is in working operation;
- a locking means associated with said rotary tool mount for locking said rotary tool mount at said second position of said rotary component of said movable arm member when one of said plurality of tools is aligned in said working position and comprising a plurality of locking recesses formed on an outer periphery of said rotary tool mount, a locking member normally biased toward said outer periphery of said rotary tool mount, and a cooperating means associated with said rotary component and said locking member for applying a releasing force to move said locking member away from said outer periphery of said rotary tool mount during movement of said rotary component of said movable arm member from said second position to said first position; and
- a plurlity of first compressed air passages angularly arranged around an outer periphery of said rotary tool mount, each of said compressed air passages being arranged at an angular position corresponding to one of said plurality of tools, and a second compressed air passage connected to a compressed air source and releasably engageable with one of said plurality of first compressed air passages corresponding to one of said plurality of tools aligned in said working positions.

9. An industrial robot according to claim 8, wherein said locking means includes means for unlocking said rotary tool mount to allow roational movement of said rotary tool mount during movement of said rotary component of said movable arm member from said second position to said first position.

10. An industrial robot according to in claim 9, wherein said second axis lies oblique to said first axis.

11. An industrial robot according to claim 10, wherein said power transmission means comprises a first stationary gear affixed to said arm member and a second rotary gear rotatable with said rotary tool mount, said second rotary gear engaging said first gear for revolution therearound to cause rotation with said rotary tool mount when said rotary component of said movable arm member is in said first, end position, and said second gear being free of engagement with said first gear when said rotary component of said movable arm member is in said second, end position.

12. An industrial robot according to claim 8, further comprising a plurality of first electric connector terminals angularly arranged around said outer periphery of said rotary tool mount, each of said pluarlity of first electrical connector terminals being arranged at an angular position corresponding to a respective one of said plurality of tools, and a second electric connector terminal connected to a controller of the robot and releasably engageable with one of said plurality of first electrical connector terminals corresponding to one of said plurality of tools aligned in said working position.

* * * * *

UNITED STATES PATENT AND TRADEMARK OFFICE
CERTIFICATE OF CORRECTION

PATENT NO. : 4,741,078
DATED : May 3, 1988
INVENTOR(S) : Akira Kimura

It is certified that error appears in the above-identified patent and that said Letters Patent are hereby corrected as shown below:

Column 1, line 5, change "INVRENTION" to INVENTION --.

Column 3, line 16, after "plurality of" insert --tools;--.

Column 5, line 52, change "42i f" to --42f--.

Column 6, line 2, change "2c" to -- 42c --.

IN THE CLAIMS

Column 10, line 55, change "comprise" to --comprises--;

line 58, change "amd" to --and--.

Column 12, line 8, change "plurlity" to --plurality

Signed and Sealed this

Tenth Day of January, 1989

Attest:

DONALD J. QUIGG

Attesting Officer

Commissioner of Patents and Trademarks